(12) United States Patent
Alenius et al.

(10) Patent No.: US 8,459,811 B2
(45) Date of Patent: Jun. 11, 2013

(54) METHOD AND APPARATUS FOR ILLUMINATION

(75) Inventors: Sakari Tapio Alenius, Lempaala (FI); Markku Kalevi Vehvilainen, Tampere (FI); Radu Ciprian Bilcu, Tampere (FI)

(73) Assignee: Nokia Corporation, Espoo (FI)

( * ) Notice: Subject to any disclaimer, the term of this patent is extended or adjusted under 35 U.S.C. 154(b) by 693 days.

(21) Appl. No.: 12/649,630

(22) Filed: Dec. 30, 2009

(65) Prior Publication Data

US 2011/0157895 A1   Jun. 30, 2011

(51) Int. Cl.
*G03B 15/02* (2006.01)

(52) U.S. Cl.
USPC ........ 362/18; 362/4; 362/5; 362/16; 362/293; 396/61; 396/157

(58) Field of Classification Search
USPC ................ 362/3–5, 16–19, 293; 396/61, 157, 396/164
See application file for complete search history.

(56) References Cited

U.S. PATENT DOCUMENTS

| | | | |
|---|---|---|---|
| 7,355,648 B1 | 4/2008 | Braun et al. | |
| 7,529,477 B2 * | 5/2009 | Endo | 396/61 |
| 7,616,874 B2 * | 11/2009 | Endo | 396/61 |
| 2006/0193622 A1 | 8/2006 | Endo | |
| 2006/0263077 A1 | 11/2006 | Endo | |
| 2010/0124041 A1 * | 5/2010 | Druchinin | 362/16 |

FOREIGN PATENT DOCUMENTS

| | | |
|---|---|---|
| EP | 2128693 A1 | 12/2009 |
| JP | 2006222637 A | 8/2006 |
| JP | 2007206405 A | 8/2007 |
| WO | 2006085834 A1 | 8/2006 |

OTHER PUBLICATIONS

International Search Report and Written Opinion received in corresponding Patent Cooperation Treaty Application No. PCT/FI2010/050914, Mar. 11, 2011, 12 pages.
Powell, Evan, "The Technology War: LCD vs. DLP", http://www.projectorcentral.com/lcd_dlp_comparison.htm, Jul. 28, 2009, 9 pages.
http://en.wikipedia.org/wiki/LCD, "Liquid Crystal Display", retrieved Aug. 22, 2011, 15 pages.
http://en.wikipedia.org/wiki/Digital_Light_Processing, "Digital Light Processing", retrieved Aug. 22, 2011, 8 pages.
http://en.wikipedia.org/wiki/LCoS, "Liquid Crystal on Silicon", retrieved Aug. 22, 2011, 3 pages.
http://en.wikipedia.org/wiki/Stroboscope, "Stroboscope", retrieved Aug. 22, 2011, 4 pages.

\* cited by examiner

*Primary Examiner* — Stephen F Husar
(74) *Attorney, Agent, or Firm* — Harrington & Smith

(57) ABSTRACT

In accordance with an example embodiment of the present invention, an apparatus comprises a light source capable of illuminating a target scene and an adjustable light filter coupled with the light source, the adjustable light filter adapted to display a filter image, the filter image created to spatially filter the illumination based at least in part on at least one parameter.

20 Claims, 3 Drawing Sheets

METHOD AND APPARATUS FOR ILLUMINATION

TECHNICAL FIELD

The present application relates generally to camera technology and more specifically to a method and apparatus for illumination.

BACKGROUND

Automatic exposure control involves generating an appropriate amount of light from a camera flash based on ambient illumination and possibly autofocus (AF) distance information. Some systems have real-time hardware feedback such that a flash pulse is terminated when enough light is reflected back from a target scene.

SUMMARY

Various aspects of examples of the invention are set out in the claims.

According to a first aspect of the present invention, an apparatus comprises a light source capable of illuminating a target scene, and an adjustable light filter coupled with the light source, the adjustable light filter adapted to display a filter image, the filter image created to spatially filter light originating from the light source based at least in part on at least one parameter.

According to a second aspect of the present invention, a method comprises directing light toward a target scene, and filtering the light using an adjustable light filter adapted to spatially filter the light based on at least one parameter.

According to a third aspect of the present invention, an apparatus comprises a light source capable of providing illumination of a target scene, an adjustable light filter coupled with said light source, the adjustable light filter comprising a filter image, at least one processor coupled with the light source and the adjustable light filter, and at least one memory including computer program code, the at least one memory and the computer program code configured with the at least one processor to cause the apparatus to perform at least the following: provide a flash illumination of the target scene, and filter light originating from the light source using the adjustable light filter based on at least one parameter.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 6 of the drawings.

Figure 1:
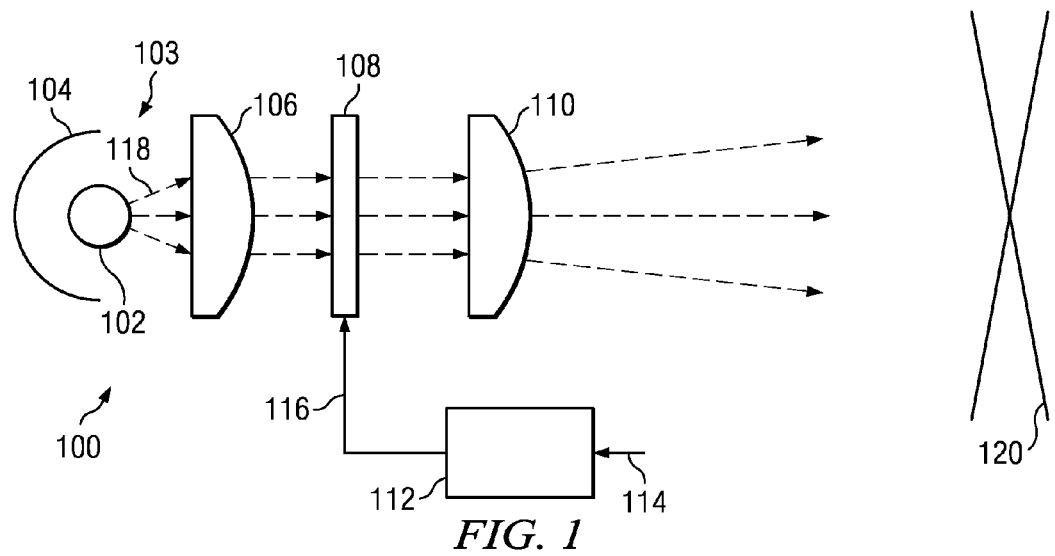
FIG. 1 is a block diagram of an apparatus for illuminating a target scene according to an example embodiment of the invention.

FIG. 1 is a block diagram of an apparatus 100 for illuminating a target scene such as target scene 120 according to an example embodiment of the invention. In an embodiment, a target scene is any field of view, target, person, place, thing, and/or the like. In an embodiment, a light source such as light source 102 with sufficient intensity for illuminating a target scene is provided. In an embodiment, light source 102 is an electronic flash, which is used in camera flash photography to illuminate a target scene and/or supplement ambient light. In an embodiment, light source 102 comprises a tube filled with xenon gas. An electric voltage may be discharged in the tube to generate an electric arc that emits a short flash of light for a desired duration. For example, the duration of the flash may be between 1 to 10 milliseconds.

In an embodiment, light source 102 comprises at least one light emitting diode (LED) with sufficient intensity such as a high current flash LED used in camera technology for illuminating a target scene. In an embodiment, light source 102 is a lamp such as those used in projector technology, which provides constant illumination. In an embodiment, light source 102 is a metal halide arc lamp, an incandescent halogen lamp and/or the like, which is capable of providing high intensity illumination for a period of time longer than a conventional camera flash.

In an embodiment, a concave or hemispherical concentrating reflector such as reflector 104 directs light into a condenser lens such as condenser lens 106. A condenser lens generally collimates and directs light toward an adjustable light filter such as adjustable light filter 108. In an embodiment, a projection lens such as projection lens 110 receives an image from adjustable light filter 108 and projects an enlargement of the image toward target scene 120. In at least one embodiment, condenser lens 106 and/or projection lens 110 are optional.

In an embodiment, adjustable light filter 108 comprises a liquid crystal display (LCD), which is capable of displaying an image received from an image processor such as image processor 112. In an embodiment, adjustable light filter 108 uses digital light processing (DLP) technology to display an image received from an image processor. In an embodiment, adjustable light filter 108 uses liquid crystal on silicon (LCoS) technology to display an image received from an image processor. Further, adjustable light filter 108 may use any other suitable projector or flash technology to display an image.

In an embodiment, an image processor such as image processor 112 receives an image signal 114, which is created based at least in part on at least one parameter such as a pre-flash image. In an embodiment, a pre-flash image is a result of a brief overall exposure taken just prior to an image forming exposure. In an embodiment, image processor 112 provides at least one adjustment to image signal 114 such as manipulating the contrast and/or converting the image to a grey scale or achromatic image, if necessary. In an embodiment, image processor 112 provides adjustable light filter 108 with an output signal 116, which includes at least one adjustment to image signal 114.

Figure 2:
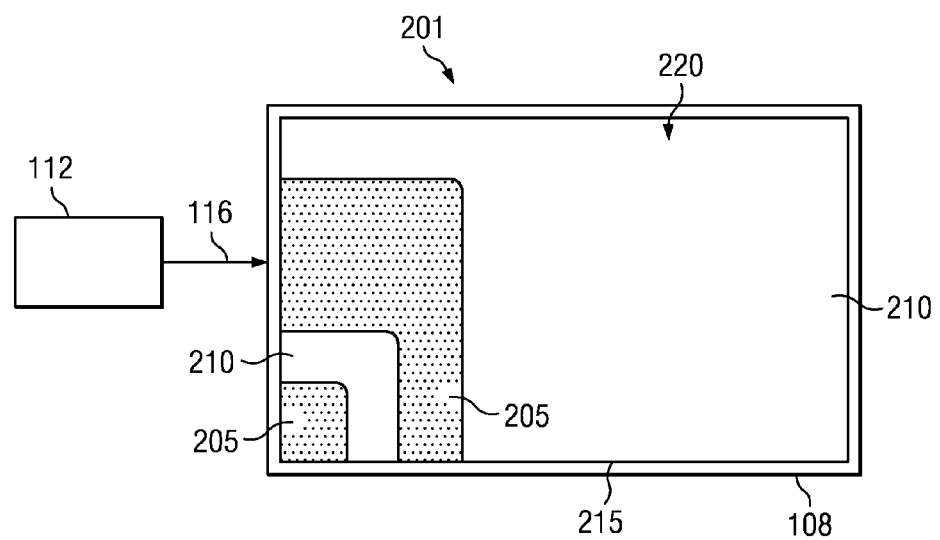
FIG. 2 is a diagram of an adjustable light filter displaying a filter image according to an embodiment of the invention.

FIG. 2 is a diagram of an adjustable light filter 201 displaying a filter image 220 according to an embodiment of the invention. In an embodiment, adjustable light filter 201 is the adjustable light filter 108 of FIG. 1. According to FIG. 2, adjustable light filter 201 comprises a display such as display 215, which is capable of displaying a filter image such as filter image 220. In an embodiment, the filter image is adapted to spatially filter light from a light source such as light source 102 of FIG. 1 based at least in part on at least one parameter such as a pre-flash image. In an embodiment, an image processor such as image processor 112 provides an image signal 116 to adjustable light filter 201, which is representative of filter image 220.

In an embodiment, adjustable light filter 201 displays filter image 220 on display 215. Adjustable light filter 201 filters light emitted from a light source such that some areas of the filter image allow more light to pass through to a target scene than other areas of the filter image. In FIG. 2, filter image 220 is a grey scale image, however, filter image 220 may be a color image, achromatic image, and/or the like, which filters at least some light from a light source and allows at least some light to pass through to a target scene.

In an embodiment, at least one region of the filter image is opaque and at least one region of the filter image is transparent. According to FIG. 2, regions 210 of filter image 220 are transparent allowing substantially all light emitted from a light source to pass through to a scene. Regions 205 of filter image 220 are shaded such that the intensity of light from a light source passing through adjustable light filter 201 in those regions is attenuated. Adjustable light filter 201 may provide regions of a target scene such as scene 120 with different intensities of illumination based on shaded regions of filter image 220.

Figure 3:
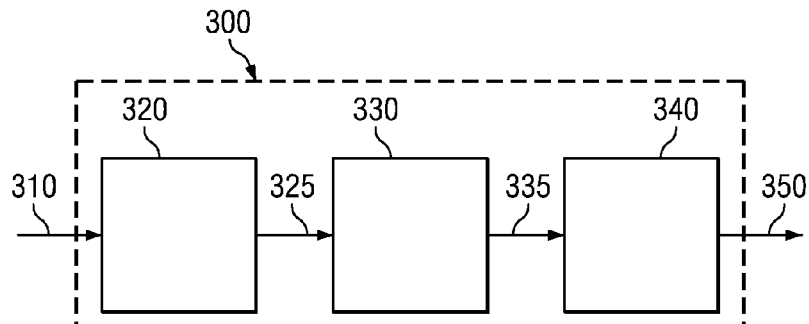
FIG. 3 is a block diagram of an image processor according to an example embodiment of the invention.

FIG. 3 is a block diagram of an image processor 300 according to an example embodiment of the invention. In an embodiment, image processor 300 is image processor 112 of FIG. 1. In an embodiment, image processor 300 is image processor 112 of FIG. 2. According to FIG. 3, image processor 300 receives an input signal 310. In an embodiment, input signal 310 is a signal, which represents a pre-flash image. In an embodiment, a pre-flash image is an image from a view finder such as a view finder equipped with any ordinary digital camera. In an embodiment, pre-flash image signal 310 represents an image having a low image resolution such as an image resolution of 100 by 100 pixels per inch. Further, pre-flash image signal 310 may represent an image having a relatively small file size.

In an embodiment, image converter 320 may adjust the brightness of the pre-flash image by attenuating the brightness of one or more areas of the image that are saturated and do not require extra illumination. In an embodiment, image converter 320 provides an output signal 325, which is used as an input signal to image converter 330.

In an embodiment, image converter 330 converts image signal 325 into a grey-scale image in which the brightness of each pixel of the grey-scale image is inversely proportional to the local brightness of the original image represented by image signal 325. The resolution of the resulting image may be low, for example 80 by 60 pixels to 320 by 240 pixels. In an embodiment, image converter 330 provides an output signal 335, which is used as an input signal to image converter 340.

In an embodiment, image converter 340 provides saturation elimination for the image corresponding to image signal 335. To provide saturation elimination, the brightness of the image corresponding to image signal 335 is adaptively attenuated such that even the brightest parts of the target scene receives some light. In an embodiment, image converter 340 provides an output image signal 350, which may be used as the filter image for adjustable light filter 108 of FIG. 1.

Figure 4:
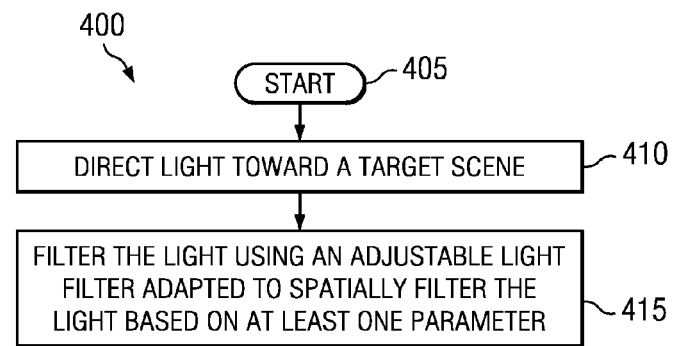
FIG. 4 is a flow diagram illustrating an example method for filtering light using an adjustable light filter according to an example embodiment of the invention.

FIG. 4 is a flow diagram illustrating an example method for filtering light using an adjustable light filter according to an example embodiment of the invention. At 405, the method begins. At 410, light is directed toward a target scene. For example, light originating from a light source such as light source 102 of FIG. 1 is directed toward a target scene such as target scene 120 of FIG. 1. In an embodiment, light is directed toward a target scene using a reflector such as reflector 104 of FIG. 1.

At 415, the light is filtered using an adjustable light filter, which is adapted to spatially filter the light based at least in part on at least one parameter. In an embodiment, the adjustable light filter is adjustable light filter 108 of FIG. 1. Further, in an embodiment, the adjustable light filter is adjustable light filter 201 of FIG. 2. At 420, the method ends.

Figure 5:
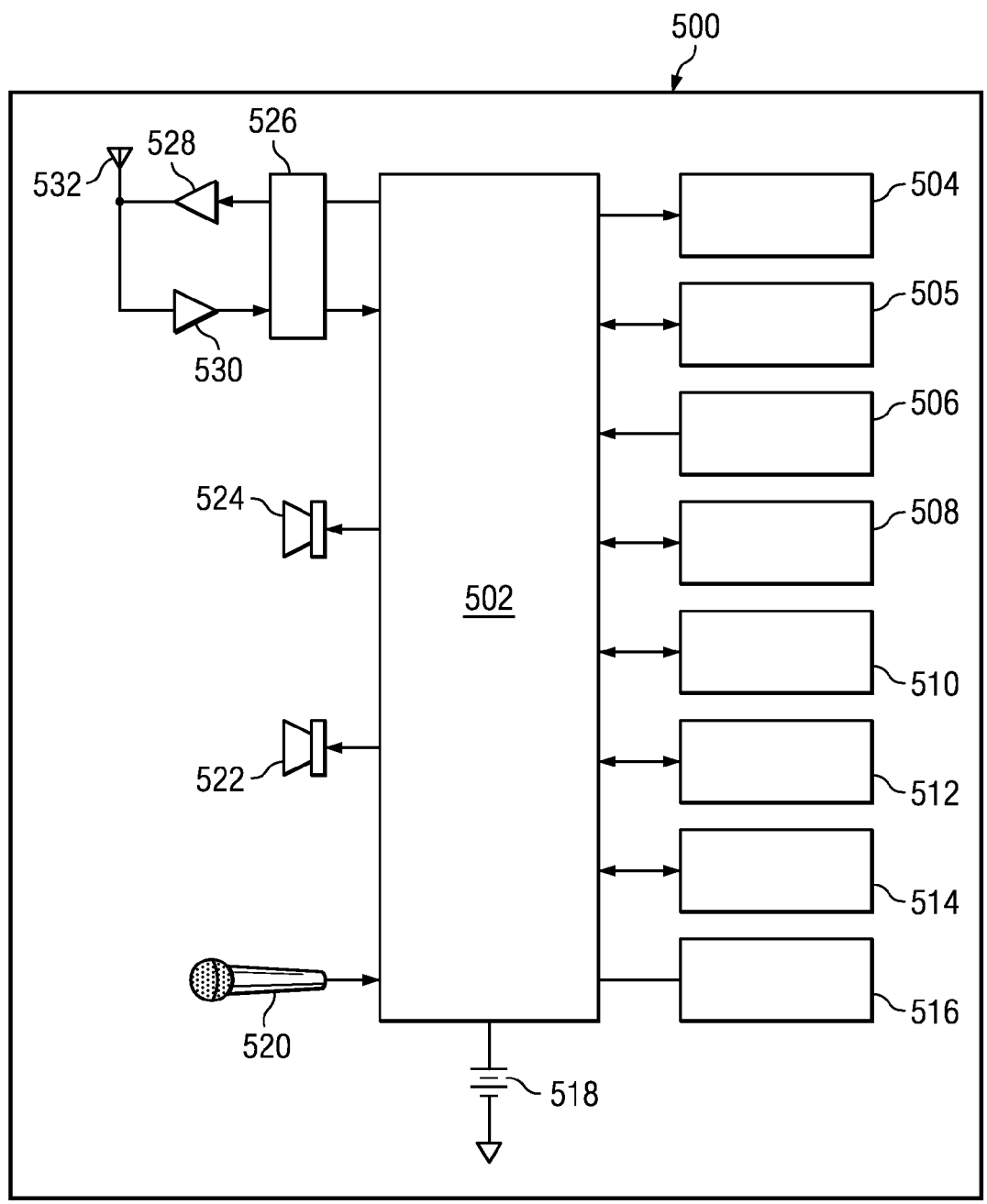
FIG. 5 is a block diagram of an apparatus operating according to an example embodiment of the invention.

FIG. 5 is a block diagram of an apparatus operating according to an example embodiment of the invention. In FIG. 5, apparatus 500 comprises at least one antenna 532 to communicate with a transmitter 528 and a receiver 530. Transmitter 528 and/or receiver 530 are connected with a network interface 526 for transmitting and receiving data with electronic devices. In an embodiment, apparatus 500 comprises at least one processor such as processor 502. In an embodiment, processor 502 comprises at least one other processing component. Processor 502 provides at least one signal to the transmitter 528 and receives at least one signal from receiver 530. In an embodiment, apparatus 500 further comprises at least one user interface that includes at least one input and/or output device coupled with processor 502, such as a conventional earphone or speaker 522, a ringer 524, a microphone 520, at least one display 504, at least one touch sensitive surface 505, which may include at least one display, at least one keypad 506 and/or the like. In an embodiment, apparatus 500 comprises at least one display and/or touch sensitive surface of any type such as but not limited to a touch screen display, and/or the like. In an embodiment, apparatus 500 further comprises a camera 514. In an embodiment, camera 514 comprises apparatus 100 of FIG. 1. In an embodiment, camera 514 comprises an adjustable light filter such as adjustable light filter 201 of FIG. 2. In an embodiment, camera 514 comprises an image processor such as image processor 300 of FIG. 3.

In an embodiment, the apparatus 500 further comprises a battery 518 for powering various circuits to operate apparatus 500. In an embodiment, apparatus 500 comprises a location determining unit (LDU) 516. In an embodiment, location determining unit (LDU) 516 comprises a Global Positioning System (GPS) receiver for receiving a geographic location of apparatus 500. In an embodiment, apparatus 500 comprises a user identity module (UIM) 508. For example, UIM 508 may be a memory device comprising a processor. The UIM 508 may comprise, for example, a subscriber identity module (SIM), a universal integrated circuit card (UICC), a universal subscriber identity module (USIM), a removable user identity module (R-UIM), and/or the like. Further, the UIM 508 may store at least one information element related to a subscriber, such as a mobile subscriber.

The apparatus 500 further comprises at least one memory such as volatile memory 510 and/or a non-volatile memory 512. In an embodiment, volatile memory 510 comprises a cache area for the temporary storage of data. Apparatus 500 further comprises non-volatile memory 512, which may be embedded and/or removable. In an embodiment, non-volatile memory 512 further comprises an electrically erasable programmable read only memory (EEPROM), flash memory, and/or the like. In an embodiment, apparatus 500 uses memory to store at least one piece of information and/or data to implement one or more features of apparatus 500. In an embodiment, the memory further comprises an identifier, such as international mobile equipment identification (IMEI)

code, capable of uniquely identifying apparatus 500. For example, the processor 502, using the stored instructions, may determine an identity, e.g., using cell identification information. LDU 516 may use cell identification information to determine a geographic location for apparatus 500.

In an embodiment, processor 502 of apparatus 500 comprises circuitry for implementing audio features, logic features, and/or the like. In an embodiment, the processor 502 comprises a digital signal processor device, a microprocessor device, a digital to analog converter, other support circuits, and/or the like. Further, in an embodiment, the processor 502 comprises features to operate one or more software programs. For example, the processor 502 may be capable of operating a software program for connectivity, such as a conventional Internet browser. Further, the connectivity program may allow the apparatus 500 to transmit and receive Internet content, such as email messages, text messages, SMS messages, MMS messages, location-based content, web page content, and/or the like. Further, processor 502 is capable of executing a software program for operating apparatus 500 such as operating at least one display 504 and/or at least one touch sensitive surface 505.

In an example embodiment, the apparatus 500 is capable of operating in accordance with any of a number of a first generation communication protocol, a second generation communication protocol, a third generation communication protocol, a fourth generation communication protocol, and/or the like. For example, the apparatus 500 may be capable of operating in accordance with second generation (2G) communication protocols IS-136, time division multiple access (TDMA), global system for mobile communication (GSM), IS-95 code division multiple access (CDMA), and/or the like. Further, the apparatus 500 may be capable of operating in accordance with third-generation (3G) communication protocols, such as Universal Mobile Telecommunications System (UMTS), CDMA2000, wideband CDMA (WCDMA), time division-synchronous CDMA (TD-SCDMA), and/or the like. Further, the apparatus 100 may also be capable of operating in accordance with 3.9 generation (3.9G) wireless communication protocols, such as Evolved Universal Terrestrial Radio Access Network (E-UTRAN) and/or the like, or wireless communication projects, such as long term evolution (LTE) and/or the like. Further, the apparatus 500 may be capable of operating in accordance with fourth generation (4G) communication protocols.

In an example embodiment, apparatus 500 is capable of operating in accordance with a non-cellular communication mechanism. For example, apparatus 500 may be capable of communication using at least one communication technique such as WLAN, Bluetooth™, RFID, Infrared and/or the like. For example, the apparatus 500 may communicate using one or more of the following WLAN techniques: IEEE 802.11, e.g., 802.11a, 802.11b, 802.11g, 802.11n, and/or the like.

Apparatus 500 may be any electronic device including but not limited to a mobile phone, portable digital assistant (PDA), a pager, a mobile television, a gaming device, a camera, a video recorder, an audio player, a video player, a television, a radio, a computer, a portable computer, a GPS device, a GPS navigation device, a GPS system, a browsing device, an electronic book reader and/or the like or any combination thereof.

Figure 6:
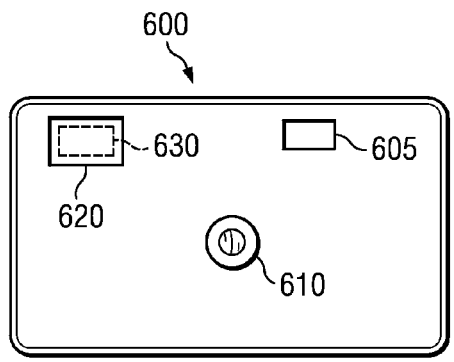
FIG. 6 is a diagram of a digital camera comprising an adjustable light filter according to an example embodiment of the invention.

FIG. 6 is a diagram of a digital camera 600 comprising an adjustable light filter according to an example embodiment of the invention. In an embodiment, digital camera 600 comprises a flash component such as flash component 620. Flash component 620 comprises an apparatus for illuminating a target scene 630, which comprises an adjustable light filter such as adjustable light filter 201 of FIG. 2. In an embodiment, the apparatus for illuminating a target scene 630 is apparatus 100 of FIG. 1. In an embodiment, digital camera 600 further comprises a camera lens such as camera lens 610. In an embodiment, digital camera 600 further comprises a view finder such as view finder 605. In an embodiment, a view finder allows a user of a digital camera to align a camera lens such as camera lens 610 with a target scene such as target scene 120 of FIG. 1. In an embodiment, digital camera 600 is camera 514 of FIG. 5.

Without in any way limiting the scope, interpretation, or application of the claims appearing below, a technical effect of one or more of the example embodiments disclosed herein is to evenly illuminate a target scene and reduce light saturation in digital photographs.

Embodiments of the present invention may be implemented in software, hardware, application logic or a combination of software, hardware and application logic. The software, application logic and/or hardware may reside on an electronic device such as but not limited to a mobile communications device. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a light source configured to illuminate a target scene;
   an image processor and
   an adjustable light filter coupled with said light source, said adjustable light filter adapted to display on a target scene a filter image as a grey-scale image, said filter image created to spatially filter light originating from said light source based at least in part on at least one parameter processed by the image processor to generate an input filter signal to the adjustable light filter to provide the grey-scale image, wherein brightness of each pixel of the grey-scale image is inversely proportional to a local brightness of a pre-flash image of the target scene.

2. The apparatus according to claim 1, wherein said at least one parameter is related to the pre-flash image.

3. The apparatus according to claim 2, wherein said pre-flash image is an image from a perspective of a view finder.

4. The apparatus according to claim 1, wherein light originating from said light source is projected through said filter image toward a target scene.

5. The apparatus according to claim 1, wherein light originating from said light source is adaptively attenuated by said filter image.

6. The apparatus according to claim 1, wherein said light source is capable of flash illumination.

7. The apparatus according to claim 1, wherein said apparatus is capable of saturation elimination.

8. The apparatus according to claim 1, wherein said adjustable light filter comprises at least one of a liquid crystal display, digital light processing technology and liquid crystal on silicon technology.

9. The apparatus according to claim 1, wherein said filter image comprises an achromatic image.

10. The apparatus according to claim 1, wherein said apparatus is at least one of a camera, a communications device, a computer and a personal digital assistant.

11. The method, comprising:
processing by an image processor at least one parameter to generate an input filter signal to an adjustable light filter to provide a grey-scale image;
providing light from a light source toward a target scene; and
filtering said light using the adjustable light filter adapted to spatially filter said light to display on the target scene a filter image as the grey-scale image based at least in part on the at least one parameter processed by the image processor, wherein brightness of each pixel of the grey-scale image is inversely proportional to a local brightness of a pre-flash image of the target scene.

12. The method according to claim 11, further comprising projecting said light toward a target scene using said light source.

13. The method according to claim 11, wherein said at least one parameter comprises the pre-flash image of the target scene.

14. An apparatus, comprising:
at least one processor coupled with a light source and an adjustable light filter; and
at least one memory including computer program code,
said at least one memory and said computer program code configured with said at least one processor to cause said apparatus to perform at least the following:
provide illumination of a target scene using said light source; and
spatially filter light originating from said light source using said adjustable light filter to display on the target scene a filter image as a grey-scale image based at least in part on at least one parameter processed by the at least one processor to generate an input filter signal to the adjustable light filter to provide the grey-scale image, wherein brightness of each pixel of the grey-scale image is inversely proportional to a local brightness of a pre-flash image of the target scene.

15. The apparatus according to claim 14, wherein said apparatus is capable of saturation elimination.

16. The apparatus according to claim 14, wherein said at least one parameter is related to a pre-flash image.

17. The apparatus according to claim 14, wherein said light source is capable of flash illumination.

18. The apparatus according to claim 14, wherein light originating from said light source is projected through said filter image toward said target scene.

19. The apparatus according to claim 14, wherein said apparatus is at least one of a camera, a communications device, a computer and a personal digital assistant.

20. The apparatus according to claim 14, wherein said at least one parameter comprises the pre-flash image of the target scene.

* * * * *